United States Patent [19]

Reil

[11] 4,074,961
[45] Feb. 21, 1978

[54] APPARATUS FOR PRODUCING CONTAINERS

[75] Inventor: Wilhelm Reil, Bensheim-Auerbach, Germany

[73] Assignee: Altstadter Verpackungs-Vertriebs GmbH, Pfungstadt, Germany

[21] Appl. No.: 675,275

[22] Filed: Apr. 9, 1976

Related U.S. Application Data

[63] Continuation-in-part of Ser. No. 575,170, May 7, 1975, and a continuation-in-part of Ser. No. 602,223, Aug. 6, 1975, said Ser. No. 575,170, is a continuation of Ser. No. 499,155, Aug. 21, 1975, abandoned, said Ser. No. 602,223, is a continuation of Ser. No. 333,723, Feb. 20, 1973, abandoned.

[30] Foreign Application Priority Data

Mar. 2, 1972 Germany .............................. 2210013

[51] Int. Cl.² .............................................. B29F 1/10
[52] U.S. Cl. .................................... 425/112; 264/263; 425/129 R
[58] Field of Search ............... 425/129, 112, 246, 346; 264/263, 163, 328, 261, 266, 268

[56] References Cited

U.S. PATENT DOCUMENTS

| | | | |
|---|---|---|---|
| 3,154,617 | 10/1964 | Schenk et al. ................... | 425/112 X |
| 3,476,852 | 11/1969 | Shattuck .......................... | 425/129 X |
| 3,511,902 | 5/1970 | Santangelo ....................... | 425/112 X |
| 3,709,967 | 1/1973 | Held, Jr. .......................... | 425/298 X |
| 3,743,458 | 7/1973 | Hallauer .......................... | 425/112 X |
| 3,780,559 | 12/1973 | Turner ............................. | 425/129 X |

FOREIGN PATENT DOCUMENTS

| | | | |
|---|---|---|---|
| 1,367,468 | 9/1974 | United Kingdom ............ | 425/129 R |

*Primary Examiner*—Francis S. Husar
*Assistant Examiner*—W. R. Briggs
*Attorney, Agent, or Firm*—Toren, McGeady and Stanger

[57] ABSTRACT

A container for storing liquids is injection molded of thermoplastic material in apparatus which includes a plurality of central die members intermittently movable in succession along a given direction and a pair of side die members flanking said central die members and movable into and out of operative engagement therewith. The container is injection molded within a die cavity formed between the central die members and the side die members with two sheets of a base material being fed from opposite sides of said central die members into said die cavity to form a base member for said container. The container base member formed from said sheets of base material is engaged about the central die members and when the side die members are brought into operative engagement with the central die members thermoplastic material is injected into the die cavity formed therebetween and the container is produced by injection molding the thermoplastic material integrally with the base member within the die cavity. The die cavity is configured to form the container with an open bottom end having a bottom closure member partially connected thereto to enable bottom filling of the container and subsequent sealing of the bottom end by pivoting of the bottom closure member into sealing engagement with the bottom end of the container. After the injection molding process is completed, the side die members are separated from the central die members and the formed container is ejected from the central die member about which it is formed. During the injection molding process the sheets of base material are joined together by a seal formed between the edges thereof in order to enable the sheets to be pulled along with the central die members as they move through the apparatus in the performance of the injection molding process.

16 Claims, 6 Drawing Figures

APPARATUS FOR PRODUCING CONTAINERS

This application is a continuation-in-part of prior applications Ser. Nos. 575,170 and 602,223 filed, respectively, May 7, 1975 and Aug. 6, 1975, these applications being, respectively, continuations of applications Ser. Nos. 499,155 and 333,723 filed, respectively, Aug. 21, 1975 and Feb. 20, 1973, both now abandoned, with application Ser. No. 499,155 having been a divisional of application Ser. No. 333,723.

BACKGROUND OF THE INVENTION

The present invention relates generally to injection molding apparatus and, more particularly, to apparatus for producing liquid storage containers. More specifically, the invention is directed to a manufacturing system wherein thermoplastic material is injection molded together with a base material to produce a container having integrally formed top and bottom closure members, with the bottom closure member being attached in a manner enabling bottom filling of the container and subsequent sealing thereof by completing attachment of the bottom closure member.

Numerous types of liquid containers are known which may be used, for example, for storing milk, juices or other types of soft drinks. The packages for such liquids are preferably block-shaped non-returnable members formed of a cardboard material coated with polyethylene on the inner side thereof.

In forming such packages or containers, blanks for the containers are, as a rule, produced in one piece and they are folded into the finished container shape with one or more connecting seams being required. Where a polyethylene coating is used, the seams may be heat sealed together.

Two important characteristics of liquid packaging, particularly packaging of the non-returnable type, are the seal tightness of the container and its ability to be easily opened for dispensing the liquid contained therein. The present invention is directed to an arrangement which is particularly effective in producing a liquid packaging member having these characteristics incorporated therein. The invention overcomes several disadvantages of prior art packaging arrangements particularly with regard to the effectiveness of the ability of the container to store the liquid and the ease with which liquid dispensing may be effected. For example, in a milk container previously known, a seam is formed at the top of the container and the seam is arranged to provide an opening by means of a perforation located at one end of the container in the vicinity of a narrow edge thereof. Before such a container is opened, the corners provided with the perforation lines must be displaced upwardly as the uppermost fold edge is torn open. Then, each cardboard strip must be torn off along the perforation line and the seal strip also is torn off without being opened. This type of a container provides significant difficulty in tearing open its closure. However, this disadvantage is tolerated since it is necessary to provide an absolutely liquid-tight package which is also fairly economical to produce. Accordingly, it will be appreciated that the solution afforded by this type of packaging is not completely satisfactory.

There are other types of non-returnable packaging containers of the prior art which require a tool, such as a knife, a scissors or the like, for opening of the container. Such packaging is not considered satisfactory because the opening requires such a tool which the consumer may not always have readily available.

Based upon the above-mentioned disadvantages, a liquid packaging member formed of cardboard or similar material and a process for forming such a container have been developed wherein there is utilized a pouring spout for opening the container and dispensing the liquid therefrom. In various known types of pouring spouts, the edges thereof have been sealed closed so that during storage of the liquid an effective seal is assured. When the container is to be used, the seam closing the spout may be torn open in an advantageous manner which requires considerably less effort than is needed with packaging members previously mentioned. Furthermore, by providing a special shape for the pouring spout, it is possible to provide an arrangement which makes it easier to direct the liquid being poured from the container.

Known types of packaging members may be further simplified to save costs in a number of various ways.

Accordingly, it is a primary object of the present invention to provide a simplified packaging arrangement for liquids without sacrificing the seal tightness of the container or its ease of opening for the practical and effective dispensing of the liquid contained therein. Additionally, the invention is intended to simplify the process for producing packaging members of the type discussed herein and to reduce the cost of the machinery required in the production operation. Furthermore, it is possible to utilize less expensive materials in a more effective manner.

SUMMARY OF THE INVENTION

Briefly, the apparatus of the present invention may be described as comprising die means including a plurality of central die members intermittently movable in a given direction between a pair of side die members flanking the central die members and movable into and out of operable engagement therewith. When the side die members are brought into engagement with the central die members, a die cavity is formed therebetween within which a container may be injection molded. The apparatus includes means for feeding a pair of separate sheets of a base material from opposite sides of the central die members with the base material being formed in engagement around the central die members in order to provide a base member for the container. With the base member engaged about the central die members, and with the side die members being brought into engagement to close the die cavity, a thermoplastic material is injected into the die cavity and an integrally formed container is produced by an injection molding process which joins the injected thermoplastic material with the base member to form the container.

The central die members are moved linearly in succession in a given direction between the side die members. The sheets of base material are brought from opposite sides of the central die members and are joined together along their edges so that they may become engaged about the forward side of a central die member taken relative to the direction of movement of the central die member between the side die members. The seal formed between edges of the sheets of base material is formed simultaneously with the injection molding process and the die cavity which is defined between the central and side die members is shaped so that as each container is injection molded, a longitudinal seal is simultaneously injection molded between the sheets of the base material. As a result, the sheets of the base material are maintained in engagement around the forward side of successive central die members so that the base material sheets may be pulled along therewith as the central die members move forwardly between the side die members.

In the formation of the containers, an interconnecting web is formed within the die cavity between successively formed containers. After the injection molding process, the central dies are moved away from the side die members which are separated to enable introduction therebetween of a next successive central die member. A central die member having a formed container engaged thereabout, is moved to a position enabling severing of the interconnecting web formed between adjacent containers with the formed containers being subsequently ejected from around the central die members.

Thus, it will be seen that a continuous mass production process is provided whereby the containers may be continuously formed by periodic injection of thermoplastic material into the die cavity containing the base member.

The die cavity which is formed between the central die members and the side die members is shaped so as to enable formation of the container with integrally connected top and bottom closure members. The top closure member is of the type which may permit opening of the container for dispensing a liquid therefrom. However, in the injection molding process of the invention, the top closure member is integrally formed to seal completely the top end of the container.

However, the bottom closure member is arranged to be connected to the bottom end of the container along one side only. The injection molding process forms the bottom closure member integrally with the container with a joint being produced therebetween so that the bottom closure member may eventually be pivoted about the joint to be brought into engagement with the bottom end of the container to enable sealing thereof. However, because of the configuration of the attachment which is formed between the container and the bottom closure member, the bottom of the container remains opened at the termination of the injection molding process so that the container may be bottomfilled and subsequently heat sealed along its bottom edges.

Accordingly, it will be seen that, in accordance with the present invention, the bottom closure member and the top closure member of the container may be formed of thermoplastic material integrally with a support material by injection molding. While the top closure member is formed in a manner which completely seals the top end of the container, the bottom closure member is secured along one edge only thereby leaving the container bottom open to enable filling of liquid therethrough. As will be readily appreciated, such a packaging member will be inexpensive to produce, is generally practical in its construction and is particularly safe. Further, a very exact form of the packaging may be obtained from which there results, in an advantageous manner, a good possibility of shrinkage for collective containers. Moreover, a favorable stability for the packaging is ensured in accordance with the invention.

Prior to the filling operation, the packaging member to be filled is in an inverted position, that is, its top end with the top closure member attached thereto will be facing downwardly and its bottom end will be directed upwardly. An advantageous feature of the invention is that the opening or pouring device for the packing member is provided as an integral part of the top closure member which is formed as an integral part of the overall container by the injection molding process. Plastic injection molding apparatus is well known and it is also known that more complicated forms can be molded of thermoplastic material in a simpler manner than can be achieved by techniques which involve folding and joining of a cardboard blank. In the production of the opening device or pouring spout, however, tools with projections are necessary which must be pushed out or pulled out after the molding in of the cover in the packaging member. If the cover member, provided with the complicated molding form, is molded along four lateral edges to the support material forming the sides of the packaging member, the tools can be pulled out or pushed out more easily. For ease in filling the packaging member, however, the member secured to the opposite end of the side walls, which subsequently forms the bottom of the member, must be left open and, as a result, the bottom is molded onto the side walls only along one edge.

A further advantage to be gained through molding the cover member and the bottom member to the packaging device as compared to welding prefabricated cover and bottom members which is also contemplated under the present invention is simplification of the tooling which is necessary for manufacturing the container of the invention. In a process involving folding and welding of side walls of a container, a die tool is required which must be positioned within the interior of the packaging member. If this tool is designed on the side facing the cover for the somewhat more complicated injection molding operation, then one half of the required tool is already present. As a result, it is only necessary to provide a counter die to effect the molding of the cover with its opening device.

Moreover, when the cover and bottom members are formed by an injection molding operation, a more effective seal can be provided with simpler means due to the fluid characteristics of the heated plastic material as compared to the type of seal obtainable when prefabricated thermoplastic cover and bottom members are attached to the side walls of a packaging container.

When prefabricated bottom and cover members are used, the members must be introduced exactly perpendicularly to the side walls and centered into the opening which is to be closed. Such a precision operation is not necessary when the cover member with its opening device is molded onto the bottom of the packaging member. Further, in the molding on of the bottom, where it is attached to only one edge of the side wall of the packaging container, an exactly adjusted guidance during the attachment is not necessary, because the hinge connection provides the necessary exact guidance in the molding step.

When the cover member is formed on the packaging member, its opening device is folded or telescoped into the packaging member so that no portion of the cover member projects beyond the ends of the side walls. Thus, the cover member or top closure member will be arranged to extend flush with the top end of the container body. As a result, the non-returnable packaging member of the invention is formed completely as a block member so that the packaging member may be stored in a very compact and stable manner. Stacking the packaging members in cardboard containers or plastic boxes even by automatic packing devices is considerably facilitated. Furthermore, the bottom filling of the container is also facilitated since the top of the container will have a generally flat or flush configuration enabling it to be placed on a flat surface in an inverted position.

Another feature of the invention involves the fact that because the container of the invention is formed in a single injection molding operation as an integral unit, no seams or heat seals need be applied along the side of the container. Only the bottom member must be sealed after filling of the container but all other seals will be integrally formed during the injection molding process.

The packaging member which is produced will have advantageous features inasmuch as it will be formed with a block-shaped configuration and it will be made of a stiff packing material which has a thermoplastic coating. Such materials are inexpensive and, as a result, an economical packaging member is provided which is particularly advantageous because of its seal tightness and the manner in which it can be usually opened.

In the performance of the process of the present invention, a plastic-coated base or support material is supplied to the apparatus of the invention in the form of two sheets or webs having a width which is generally equivalent to the height of the container to be formed. A plurality of central die members are moved in a given direction and the sheets of base material are fed from opposite sides of the central die members. Because the injection molding process which is performed maintains the two sheets in constant connection with each other, the movement of the central die members will tend to pull or draw the sheets through the apparatus. As the central die members move to between the side die members, the sheets are caused to surround the central die members thereby forming within the die cavity of the apparatus a base member for the container which is to be injection molded. The die cavity is configured so that the top closure member is completely sealed to the side walls of the container while the bottom member is attached only along one edge. The coated support or base material may consist of a relatively rigid or strong material and accordingly, the packaging member will be formed in a sturdy and stable arrangement. Furthermore, the process of manufacture of the container can be carried out automatically in a continuous operation thereby enabling mass production techniques to be applied to the manufacturing process. The molding operation can be carried out quickly and reliably and, furthermore, relatively simple molding members can be utilized.

A further advantageous feature of the invention resides in the fact that since the top and bottom closure members are integrally formed with the container body during the injection molding process a further simplification in the manufacturing procedures is involved in that the storage of cover members for the top and bottom of the containers is not required.

A further advantage is obtained in that the finished container, open at its bottom, may be conveyed to a filling station where the liquid to be stored is charged into the container and then the bottom closure member may be sealed to the remaining edges of the side walls to effect a liquid-tight seal about all its edges. As a result, a compact arrangement of apparatus can be set up to which the packaging material and the plastic material is supplied in the form of a web and from which the filled and completely liquid-tight packaging container can be removed. Due to the simple form of the blank from which the side walls are formed and the simple production process, the apparatus required is neither complicated nor bulky. Accordingly, the process as disclosed above can be used in relatively small filling operations.

In accordance with the present invention, a considerable advantage is obtained in a novel packaging device which involves a combination of plastic coated support material and thermoplastic material whereby the folding required for closing and sealing known cardboard packaging containers can be omitted. The various folds required in such packaging often lead to leaks and the avoidance of such folds provides a particularly advantageous arrangement with regard to the tightness of the container which is produced. In the new packaging arrangement according to the invention, the advantages obtained from cardboard packaging are combined with those attained from plastic non-returnable bottles.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiments of the invention.

DETAILED DESCRIPTION OF THE PREFERRED EMBODIMENTS

Figure 1:
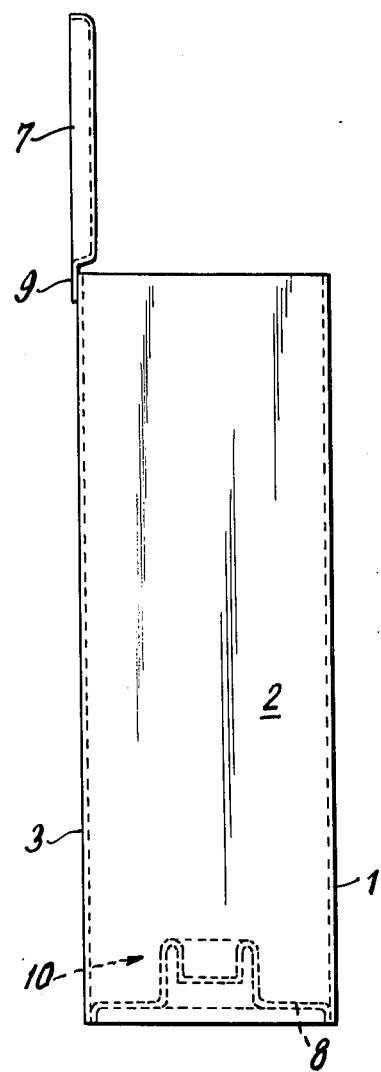
FIG. 1 is an elevational view of a packaging member produced in accordance with the present invention in a condition ready to be filled.

Referring now to the drawings, wherein like reference numerals are used to refer to similar parts throughout the various figures thereof, there is shown in FIGS. 1–4 the container to be manufactured by the apparatus and process of the present invention. The container comprises a generally cylindrical body portion having a quadrilateral cross section configuration formed by side walls 1, 2, 3 and 4. The container is formed from a base of very stiff material which may be coated, preferably on both sides, with a plastic such as polyethylene. As a result, the container is generally sturdy and stiff and, therefore, stable in form.

The container includes a bottom closure member 7 and a top closure member 8 which are formed of thermoplastic material. These members are injection molded, in a manner to be described more fully hereinafter, integrally with the body of the container in the shape indicated in the drawing. The top closure member 8 is molded on to the top end of the container in a manner to completely seal the top end. Thus, the top closure member 8 is attached to the top end of the container along the edge of each of the walls 1, 2, 3 and 4. The bottom closure member 7, on the other hand, is connected along one edge only of the container wall 3 by an integrally molded thermoplastic connection 9 which forms a hinge-like attachment for the closure member 7. As indicated in FIG. 1, the container as initially formed has the bottom closure member 7 attached to the side wall 3 in an upright position with the closure member 7 remaining in this position until liquid is filled into the container at which time the closure member 7 may be folded downwardly about the connection 9 to completely close the bottom end of the container. After filling of the container and closing of its bottom end by folding down of the closure member 7, the closure member 7 may be sealed along the edges of the side walls 1, 2 and 4 and the container may be inverted into its upright position shown in FIG. 2. In the upright position, the bottom end of the container with the bottom closure member 7 will face downwardly and its top end with the top closure member 8 will be upwardly directed.

Figure 2:
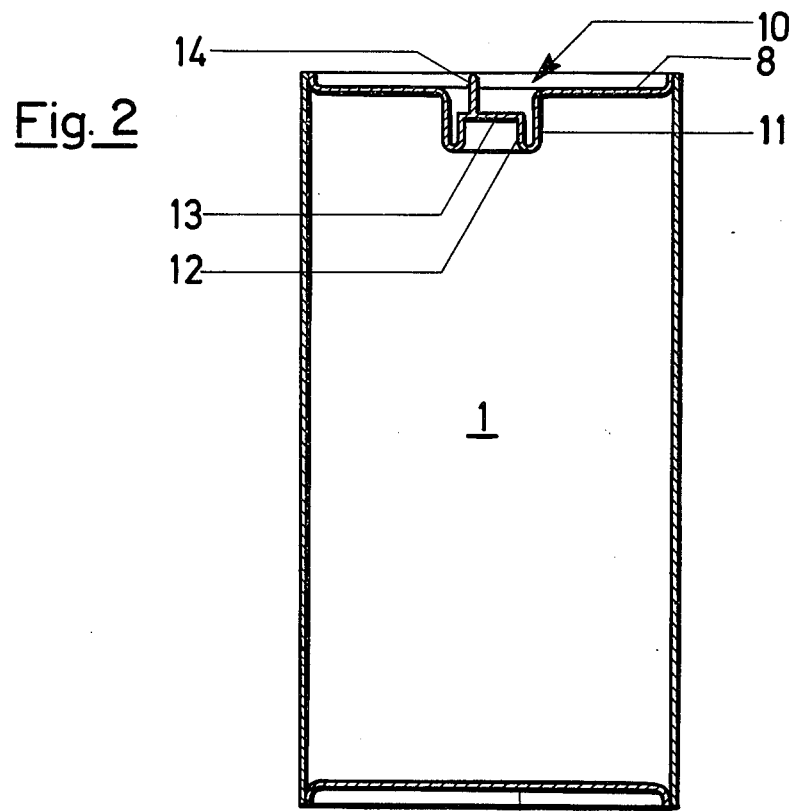
FIG. 2 is an elevational view of the packaging member after the filling has been completed and the open bottom portion of the member has been closed with the container inverted into its upright condition ready for use.

The top closure member 8, as most clearly seen in FIG. 2, comprises an opening or pouring device 10 generally centrally located in the top closure member 8. The closure member 8 is arranged to be reentrant into the body of the container and includes a cylindrical wall 11 extending from the closure member 8 and a smaller diameter cylindrical wall 12 extending generally parallel to the wall 11 and sapced therefrom. As shown in FIG. 2, the formation of the top closure member 8 is such that the walls 11 and 12 are generally telescoped into the end of the container. The end of the wall 12 is closed by a tab member 13 upon which there is provided an outwardly projecting handle or grip 14. Although the closure member 8 with the pouring device 10 effects a liquid-tight seal for the upper end of the container, it is formed in such a manner that the container may be easily opened for removal therefrom of the liquid contained therein.

Figure 4:
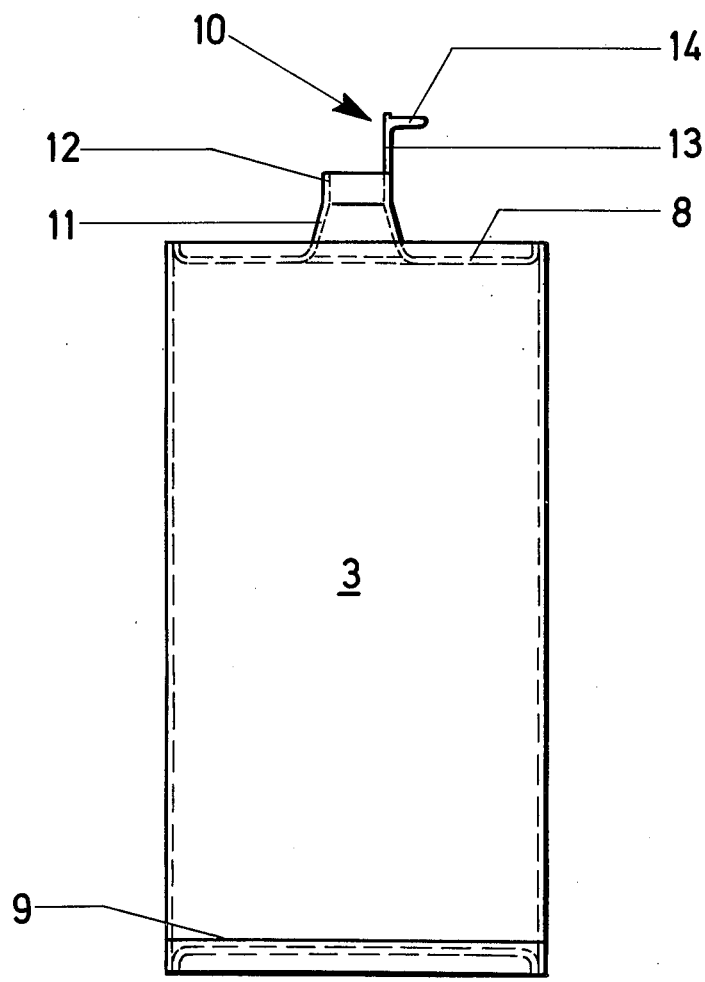
FIG. 4 is an elevational view showing the container with its top closure member in the open condition for dispensing of the liquid contained therein.

In FIG. 4, the container is illustrated in the opened condition. To open the pouring or opening member 10, the pouring device is pulled outwardly from its telescoped position within the container by an outwardly directed force supplied by gripping the handle 14. When this occurs, the cylindrical walls 11 and 12 will project outwardly and with a further pulling action on the handle 14, a seam fixing the tab 13 to the wall 12 will be broken and the tap may be moved upwardly clearing the opening so tht liquid can be poured from the container. Thus, as seen in FIG. 4, by pulling upwardly on the handle 14, the walls 11 and 12 will form a pouring spout for the container.

Thus, it will be seen that the container of the present invention is formed with a generally cylindrical body portion which is constructed of a plastic coated base material and which has injection molded a thermoplastic bottom and top closure members 7 and 8 integrally formed therewith. The bottom closure member 7 is formed in a manner, depicted in FIG. 1, which enables bottom filling of the container and the top closure member 8 is such that the container may be placed in an inverted position with its top end sitting firmly upon a flat surface to facilitate bottom filling of the container. Despite the fact that the top closure member 8 enables the container to be firmly placed upon a flat surface for filling, it nevertheless provides a liquid-tight seal and facilitates opening and pouring from the container of the liquid contained therein.

Figure 5:
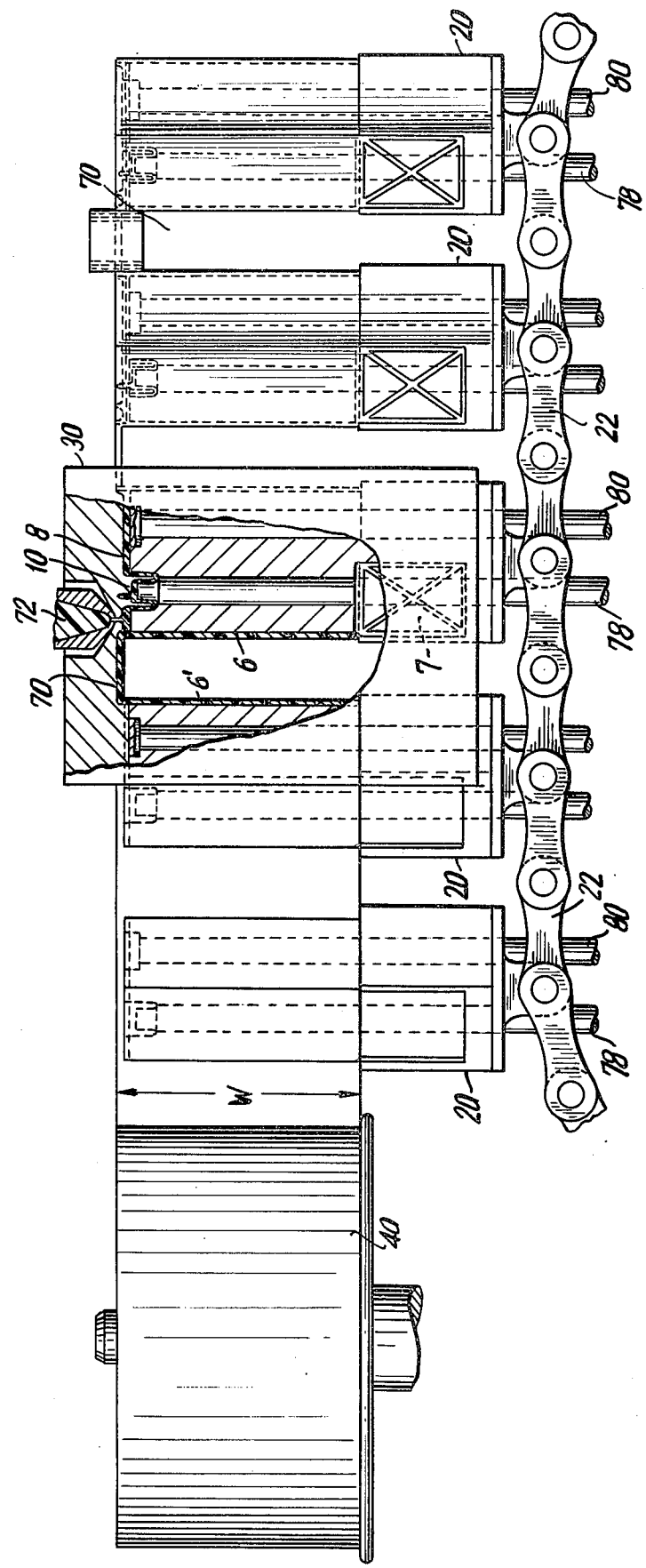
FIG. 5 is a side elevational view partially broken away showing the apparatus for manufacturing the container of the present invention and indicating a portion of the die cavity within which the container is formed with a thermoplastic material injection nozzle shown in place for injecting thermoplastic material into the die cavity.
Figure 6:
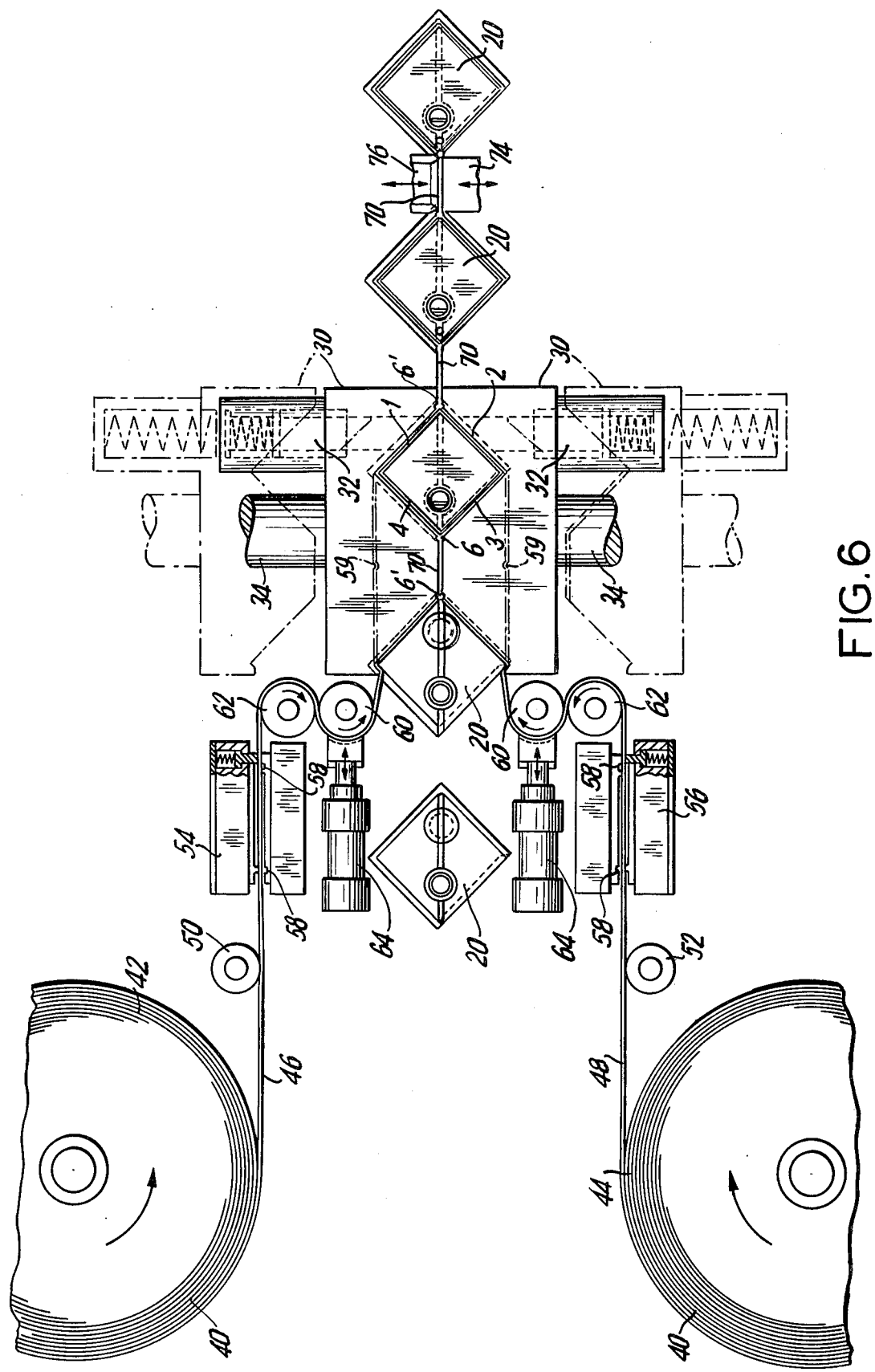
FIG. 6 is a top view of the apparatus of FIG. 5 depicting the infeed of the sheets of base material and the movement of the central and side die members of the apparatus.

The apparatus for manufacturing the container depicted in FIGS. 1–4 is shown in FIGS. 5 and 6. The apparatus of the present invention comprises a plurality of central die members 20 intermittently movable from left to right as viewed in the drawings of FIGS. 5 and 6. The central die members 20 are attached to a chain drive mechanism 22 which operates to effect appropriate movement of the central dies 20. Each of the dies 20 comprises an elongated generally cylindrical configuration having a quadrilateral sectional form.

During their intermittent motion, the dies 20 are passed between a pair of side die members 30 which are movable into and out of engagement with the central die members 20. The position of the side die members 30 when they are out of engagement with the central die members 20 is shown in dotted form in FIG. 6 with the engaged position being shown in solid form. The side die members 30 each include a spring plunger 32 and a support rod 34 whereby the dies 30 may be moved together and apart during the operation of the molding apparatus of the invention.

With the die members 30 in the engaged position shown in solid form in FIG. 6, a die cavity having a configuration conforming to the configuration of the container to be manufactured is defined between the side die members 30 and the central die members 20. As best seen in FIG. 5, the die cavity defined between the dies 20 and 30 includes a portion thereof within which the top closure member 8 and the bottom closure member 7 may be formed. The inner surfaces of the die members 30 are formed to mate with the outer surface of the die members 20 in order to enable injection molding within the die cavity formed therebetween of a container having the configuration shown in FIGS. 1–4.

Figure 3:
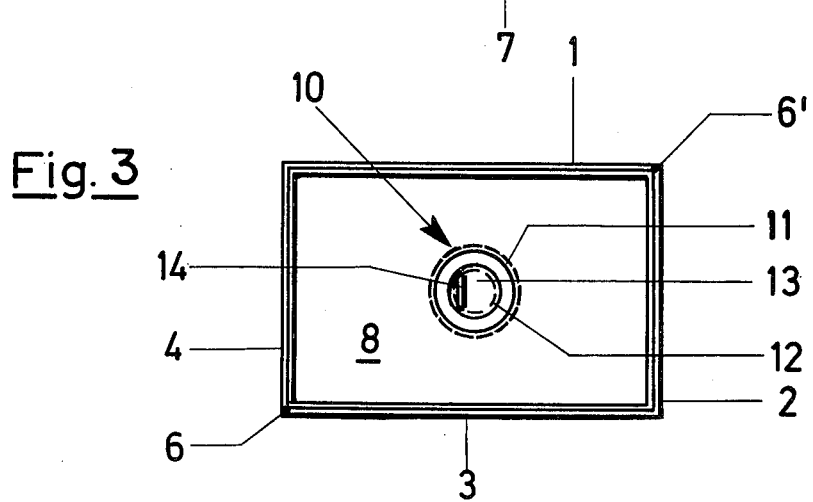
FIG. 3 is a top view of the container shown in FIG. 2.

As shown in FIG. 3, the formed container having a generally quadrilateral configuration includes a pair of injection molded beads 6 and 6' located at diametrically opposed corners of the container body and extending along the lengths thereof. The heads 6 and 6' are formed in the portions of the die cavity extending along the forwardmost and rearmost corners of the central die members 20 as seen in FIG. 6. Each side of the die members 20 defines one side of the portion of the die cavity within which the side walls 1, 2, 3 and 4 of the container body are molded. The location of each of the sides of the container body within the die cavity defined between the dies 20 and 30 is shown in FIG. 6 and the portion of the die cavity within which the bottom closure member 7 is formed is best seen in FIG. 5. As shown therein, the bottom closure member 7 will extend downwardly from the portion of the die cavity within which the side wall 3 is formed. The die cavity is so configured that the portion thereof within which the bottom closure member 7 is formed will extend generally in the same plane as the portion of the die cavity within which the side wall 3 is formed.

Thus, when the die members 30 are brought together into engagement on either side of a die member 20, there will be formed therebetween a die cavity having a portion thereof shaped in the configuration of the container to be formed and, as more clearly described hereinafter, when thermoplastic material is injection molded into the die cavity formed between the die members 20 and 30, a container such as that depicted in FIGS. 1-4 will be produced with integrally connected bottom and top closure members 7 and 8.

In the operation of the apparatus of the invention, a base material in sheet or web form is introduced into the die cavity from opposite sides of the die members 20. As best seen in FIG. 6, the base material 40 is unwound from a pair of rolls 42 and 44 thereof with two sheets 46 and 48 being drawn from the rolls 42 and 44 as the rolls are turned in the directions of the arrows shown in FIG. 6. The sheets 46 and 48 comprise a width dimension W which is generally equivalent to the height of the side walls 1-4 of the container depicted in FIGS. 1-4. As the sheets 46 and 48 are drawn from the rolls 42 and 44 they are directed by guide rollers 50 and 52 into a pair of crimping members 54 and 56. The crimping members 54 and 56 crimp the sheets 46 and 48 as shown at 58 in order to facilitate tearing of the sheets of base material along a severance line coincident with a crimp 59 formed in the material by the members 54,56.

As the sheets 46, 48 leave the crimping members 54,56 they are drawn between a pair of guide rollers 60,62 with each of the guide rollers 60 having operatively associated therewith a brake cylinder 64 for controlling the intermittent feed of the sheets 46,48. After leaving the rollers 60, the sheets 46,48 are brought into engagement about a central die member 20.

The side die members 30 are shaped to extend into engagement completely around a first die member 20 and into partial engagement about the front portion of a next succeeding die member 20, as best seen in FIG. 6. The die members 30 are configured to define between adjacent die members 20 a portion of the die cavity within which there may be produced an interconnecting web or filament 70 which will extend between successively formed containers.

As seen in FIG. 6, two die members 20 will be simultaneously in engagement between the die members 30 with the forwardmost die member 20 being completely surrounded by the die members 30 with the next adjacent die member 20 located rearwardly thereof having its two forward sides in engagement between the die members 30. The rearmost die member 20 in engagement between the die members 30 will have formed at a corner thereof the injection molded bead 6' forming one of the corners of the container body. However, as best seen in FIG. 6, the formation of the bead 6' at the rearmost die member 20 in engagement between the die members 30 operates to join together the sheets 46 and 48 of base material. Accordingly, as seen in FIG. 6, as the two sheets of base material 46 and 48 are brought from the roller 60 they will be in engagement about the front side of a die member 20 and they will be joined together by the molded bead 6'. As a result, when the side die members 30 are separated and the die members 20 are indexed to move forwardly to effect a next succeeding step in the injection molding process, the sheets 46 and 48 will be pulled or drawn by the forward movement of the central die member 20 about which they are engaged. As a result, the sheets of base material 46 and 48 will be drawn into the die cavity within which the container is to be formed and will, as a result, completely surround a die member 20 to form within the die cavity a base member for the body of the container.

With the side die members 30 brought into engagement with the central die members 20, as shown in solid line form in FIG. 6, and with the base member formed from the sheets 46 and 48 located within the die cavity thus formed, thermoplastic material may be injected into the die cavity through an injection nozzle 72 in order to fill the vacant portions of the die cavity with thermoplastic material. As a result of injection of thermoplastic material into the die cavity through the injection nozzle 72, the container will be molded within the die cavity and there will be also formed the web or filament 70 and the molded bead 6' for the next succeeding container to be formed.

After the injection molding step has been completed, the die members 30 are separated and the die members 20 are indexed forwardly into position for engagement between the side die members 30. The die members 30 are then again brought together into engagement and the injection molding step is repeated in order to form a next succeeding container. This procedure is continuously repeated with the die members 20 being intermittently moved forwardly between the die members 30 while the sheets 46 and 48 are intermittently drawn off the rolls 42 and 44. The brake cylinders 64 operate to brake the rollers 60 in order to facilitate control of the intermittent motion of the sheets 46 and 48 thereby enabling these sheets to be moved in synchronism with movement of the die members 20.

The sheets 46, 48 are held in tension between the central die members 20 before the side die members 30 are brought together by the braking action of the cylinders 64 upon the rollers 60. Thus, when the die members 30 are brought together they will cause tearing or severing of the sheets 46,48 along the crimps 59, and the severed sheets will thus be brought to position about the die members 20 to form the sides of the containers as indicated.

After the injection molding process, and with the die members 30 in the separted dotted line position shown in FIG. 6, the die member 20 about which a container has been formed is moved to the right, as viewed in FIG. 6, out of position from between the die members 30. At this point, an interconnecting filament 70 will extend between adjacent formed containers. As the die members 20 are moved rightwardly of the die members 30, a pair of cutting blades 74,76 are actuated to sever the interconnecting filament 70 from adjacent formed containers.

Each of the die members 20 includes a pair of ejection pins 78 and 80 which will operate to eject a formed container from the die members 20 after the interconnecting filament 70 has been severed by the cutting blades 74,76. The ejector pins 78 and 80, as seen in FIG. 5, are moved upwardly into engagement with the top closure member 8 of the container and inasmuch as the bottom end of the container is opened, the container may be ejected from the die member 20 by the pins 78 and 80 by a force applied to the underside of the top closure member 8, as viewed in FIG. 5.

After ejection from a central die member 20, the formed containers may be brought to a filling station in an inverted position, depicted in FIG. 1, and a filling operation (not shown) may be effected through the opened bottom end of the container. Subsequently, as previously described, the bottom closure member 7 may be brought into sealing condition and sealed about the edges of the side walls 1, 2 and 4 of the container.

From the foregoing it will be seen that the present invention enables the performance of an injection molding process wherein a container may be formed in an integral configuration with all the parts thereof being molded in a single die cavity. The container is formed with an open bottom but a bottom closure member is integrally attached thereto for subsequent sealing of the container. Because of the particular configuration of the die cavity and the manner in which the bottom closure member is formed, several advantages arise. First of all, the formed container may be easily ejected from the die about which it is formed. Secondly, bottom filling and subsequent sealing of the container is enabled. Furthermore, the top closure member of the container through which dispensing is to be ultimately performed, is made integral with the container body in a liquid-tight arrangement but at the same time easy dispensing of the liquid within the container is enabled by the shape of the top closure member. The operation of the present invention essentially involves a one-shot injection molding technique without requiring complicated tools or other expensive equipment for forming the container. As a result of the techniques enabled by the present invention, no folding operations are involved and it is unnecessary to separately seal the sides of the container. Furthermore, the top closure member 8 is formed integrally with the container body at the same time that the overall container is formed and there is thus not required a separate operation to connect the top closure member to the container body. As a result, a good liquid-tight top seal is formed. The only operation subsequent to the injection molding of the container which is required is sealing of the bottom closure member 7 but this again involves a relatively simple operation in that, after filling of the container, only the unsealed edges of the bottom closure member need be sealed. The bottom closure member is formed integrally with the container body and, accordingly, it is unnecessary to store bottom closure members or to fit such bottom closure members separately onto the container body. It is only necessary to fold the bottom closure member 7 after filling of the container and to heat seal its edges into liquid-tight engagement with the container side walls.

The overall operation of the apparatus described herein may be effected in a continuous manner and mass production techniques may be applied. The containers which are to be formed may be formed sequentially in continuous series thereby giving rise to high production capabilities. The sheet material forming the base member for the container is continuously drawn from rolls and thus it is unnecessary to handle and transport separate individual constituent parts which must be separately assembled in the formation of a container. It is only necessary to dispense from rollers the sheets forming the base member and to injection mold thermoplastic into the die cavity of the apparatus. Because of the overall arrangement of the apparatus, intermittent feed may be readily controlled and accurately effected and, by operation of the apparatus of the invention, a steady stream of formed containers may be produced and delivered to a filling station with greater ease, lower cost and more economical production techniques then were heretofore attainable.

While a specific embodiment of the invention has been shown and described in detail to illustrate the application of the inventive principles, it will be understood that the invention may be embodied otherwise without departing from such principles.

I claim:

1. Apparatus for injection molding containers from thermoplastic material comprising central die means including a plurality of individual central die members and motive means moving said central die members intermittently one behind the other along a given path, side die means including a pair of side die members flanking said central die means and including means moving said side die members transversely to said given path of said central die members into and out of operative engagement with said central die means, said central die means and said side die means being configured to form therebetween when in operative engagement with each other a die cavity within which thermoplastic material may be injected to form said containers, means for supplying into said die cavity a base material about which thermoplastic material may be injection molded to form said containers, said base material supply means being operative to supply said base material in the form of two separate sheets from opposite sides of said central die means, means operable to inject into said die cavity a thermoplastic material, said motive means operating to move said central die members in succession from one side of said side die members to between said side die members and to the opposite side of said side die members, said central and side die means forming a die cavity configured to receive injected thermoplastic material to form a seal between said separate sheets of base material at a point rearwardly of a given central die member when said given central die member is in engagement between said side die members, the next succeeding central die member being positioned to engage said sheets of base material to pull said sheets from said supply means thereof as said next succeeding central die member moves to between said side die members, and means operable to inject formed containers from about said central die means when said side die means are out of operative engagement with said central die means.

2. Apparatus according to claim 1 wherein said two sheets of base material are continuously fed to around said central die means in synchronism with the movement of said central die means in said given direction.

3. Apparatus according to claim 1 adapted to form said containers in succession with each container being joined by said injection molding to a next adjacent container by a molded interconnecting filament formed at least in part integrally with said sheets of base material, said apparatus further including means for severing said containers from said interconnecting filament and from each other.

4. Apparatus according to claim 1 wherein said two sheets of base material are continuously maintained joined together to extend about the forward side of said central die means taken relative to said given direction of movement thereof, with said sheets being thereby pulled along by said central die means to become engaged around said central die means within said die cavity when said side die means are brought into operative engagement with said central die means.

5. Apparatus according to claim 1 wherein said central die members comprise a plurality of longitudinally extending central die members, said central die members being arranged to pass between said side die members with an intermittent movement, said side die members being brought together from opposite sides of said central die members during a stationary phase of said intermittent movement into operative engagement with at least one of said central die members in order to form said die cavity together therewith.

6. Apparatus according to claim 5 wherein said plurality of central die members are passed between said side die members in linear succession, said side die members when brought together to form said die cavity being configured to completely surround at least one of said central die members and at least a portion of a next adjacent central die member located rearwardly of said at least one central die member taken relative to the direction of motion thereof, said side die members thereby forming together with said portion of said next adjacent central die member a portion of said die cavity wherein said sheets of base material are joined together along a forward side of said next adjacent central die member, with said sheets being thereby pulled along with said next adjacent central die member to the position previously occupied by said at least one central die member in order to enable said next adjacent central die member to be completely surrounded by said side die member to form therebetween a portion of said die cavity within which said container is injection molded while said sheets of base material are held in position within said die cavity around said next adjacent central die member, said injection molding being continuously repeated as each of said central die members are brought into position to form said die cavity in order to effect continuous sequential formation of said containers with said sheets of base material being continuously pulled along to within said die cavity together with said central die members.

7. Apparatus according to claim 1 wherein said die cavity is configured to form said container with a generally cylindrically shaped body having a bottom end and a top end and with a top closure member at said top end and a bottom closure member at said bottom end, said cylindrically shaped body, said top closure member and said bottom closure member being formed together as an integral unit by said injection molding within said die cavity.

8. Apparatus according to claim 1 wherein said sheets of base material comprise a thermoplastic coating thereon.

9. Apparatus according to claim 7 wherein said sheets of base material are formed with a width dimension which is generally equivalent to the height of said cylindrically shaped body.

10. Apparatus according to claim 7 wherein said container is formed with said bottom closure member integrally joined to said cylindrically shaped body along a portion only thereof so that said bottom end of said formed container remains in an opened condition after ejection of said formed container from said central die means to enable subsequent filling of said container through said bottom end, said bottom closure member being formed joined to said cylindrical body in a manner enabling said bottom closure member to be further attached to said cylindrical body to seal said bottom end after filling of said container.

11. Apparatus according to claim 10 wherein said cylindrical body and said bottom closure member comprise generally quadrilateral configurations with said bottom closure member being formed within said die cavity integrally joined to said cylindrical body by a joint extending therebetween along one side only of each of said quadrilateral configurations.

12. Apparatus according to claim 11 wherein said joint extending along said one side only is formed to enable turning of said bottom closure member thereabout from a position upstanding from said cylindrical body into a position closing off said bottom end thereof.

13. Apparatus according to claim 7 wherein said top closure member is formed in said die cavity integrally joined to said cylindrical body to seal said top end in a generally liquid-tight manner, said top closure member comprising means for enabling unsealing of said top end to dispense therefrom material stored within said container.

14. Apparatus according to claim 13 wherein said top cover member is formed in said die cavity recessed inwardly of said cylindrical body to extend flush across said top end thereof.

15. Apparatus according to claim 7 wherein said top closure member is integrally formed in said die cavity to include a tubular member spaced inwardly from said container body, said tubular member having a first tubular section and a second tubular section extending continuously with each other and formed in a generally overlapping relationship, a tab sealed to and extending transversely across an end of said second tubular section spaced from said first tubular section and forming a closure for said tubular section, and a handle secured to and extending outwardly from said tab, said tubular member being axially displaceable between a telescoped position with said second tubular section located within said first tubular section and said tubular member recessed inwardly from said top closure member within said container body and a projecting position with said second tubular section projecting axially from said first tubular section and said tubular member projecting outwardly from said top closure member.

16. Apparatus according to claim 1 wherein said seal joining said two sheets of base material together during said injection molding comprises a seam which is formed to constitute a part of said formed container.

* * * * *